(12) United States Patent
Taillemite

(10) Patent No.: US 10,030,635 B2
(45) Date of Patent: Jul. 24, 2018

(54) SOLAR REFLECTOR IN COMPOSITE MATERIAL BASED ON RESIN REINFORCED WITH CUT FIBRES, AND USES IN SOLAR PLANTS

(75) Inventor: Sebastien Taillemite, Chaville (FR)

(73) Assignee: Polynt Composites France, Drocourt (FR)

( * ) Notice: Subject to any disclaimer, the term of this patent is extended or adjusted under 35 U.S.C. 154(b) by 1423 days.

(21) Appl. No.: 13/883,423

(22) PCT Filed: Nov. 3, 2011

(86) PCT No.: PCT/EP2011/069286
§ 371 (c)(1),
(2), (4) Date: Jul. 9, 2013

(87) PCT Pub. No.: WO2012/059527
PCT Pub. Date: May 10, 2012

(65) Prior Publication Data
US 2013/0283794 A1    Oct. 31, 2013

(30) Foreign Application Priority Data
Nov. 4, 2010   (FR) ..................... 10 04338

(51) Int. Cl.
*F24J 2/10*    (2006.01)
*F24J 2/46*    (2006.01)
(Continued)

(52) U.S. Cl.
CPC ............ *F03G 6/06* (2013.01); *B29C 37/0032* (2013.01); *B29C 70/12* (2013.01);
(Continued)

(58) Field of Classification Search
CPC ..... B29C 37/00; B29C 37/0032; B29C 70/02; B29C 70/12; B29D 11/00;
(Continued)

(56) References Cited

U.S. PATENT DOCUMENTS 4,115,177 A     9/1978 Nelson
4,645,714 A *   2/1987 Roche ................... F24J 2/1057
                                                    359/884
(Continued)

FOREIGN PATENT DOCUMENTS

DE    4024481 A1    2/1992
EP    2206991 A2    7/2010
(Continued)

OTHER PUBLICATIONS

First Office Action (PCT Application Entering the National Phase) for Chinese Patent Application No. 201180064088.8, dated Oct. 28, 2014 (English translation).
"Concentrating Solar Power, Global Outlook 2009," Greenpeace International, SolarPACES and ESTELA, pp. 17-30.

*Primary Examiner* — Laert Dounis
(74) *Attorney, Agent, or Firm* — Neal, Gerber & Eisenberg LLP

(57) ABSTRACT

The invention relates to a solar reflector for concentrated solar power plants, comprising a substrate a) in composite material based on resin reinforced with cut fibers, said substrate having means b) for attachment without either perforation or gluing, and a metallic reflective coating layer c). The reflector of the invention is used in solar collectors and in solar plants operating on concentrated solar power, more particularly for producing electricity, steam and/or heat.

24 Claims, 1 Drawing Sheet

(51) Int. Cl.
*G02B 5/08* (2006.01)
*F03G 6/06* (2006.01)
*G02B 1/18* (2015.01)
*G02B 1/14* (2015.01)
*B29C 37/00* (2006.01)
*B29C 70/12* (2006.01)
*B29D 11/00* (2006.01)
*G02B 1/10* (2015.01)
*G02B 5/10* (2006.01)
*G02B 27/00* (2006.01)

(52) U.S. Cl.
CPC ....... B29D 11/00596 (2013.01); F24J 2/1057 (2013.01); G02B 1/105 (2013.01); G02B 1/14 (2015.01); G02B 1/18 (2015.01); G02B 5/0808 (2013.01); G02B 5/10 (2013.01); G02B 27/0006 (2013.01); *F24J 2002/4676* (2013.01); *Y02E 10/46* (2013.01)

(58) Field of Classification Search
CPC ......... B29D 11/00596; F03G 6/06; F24J 2/10; F24J 2/1057; F24J 2002/1071; G02B 1/10; G02B 1/105; G02B 5/08; G02B 5/0808; G02B 5/10; G02B 27/0006; Y02E 10/46
USPC ....... 60/641.15; 359/359–360, 838, 871, 883
See application file for complete search history.

(56) References Cited

U.S. PATENT DOCUMENTS

| | | | |
|---|---|---|---|
| 4,811,034 A | | 3/1989 | Kaminskas |
| 4,840,825 A | * | 6/1989 | Aristodimou ........... E04F 15/02 404/41 |
| 5,178,709 A | | 1/1993 | Shimodaira et al. |
| 5,428,483 A | | 6/1995 | Sato et al. |
| 6,079,827 A | * | 6/2000 | Coleman ................... B24B 9/14 351/159.62 |
| 6,989,924 B1 | | 1/2006 | Jorgensen et al. |
| 2007/0223096 A1 | * | 9/2007 | O'Connor ............. F24J 2/1057 359/584 |
| 2008/0252862 A1 | | 10/2008 | Okura et al. |
| 2009/0283133 A1 | * | 11/2009 | Hebrink ................ G02B 1/105 136/246 |
| 2010/0220392 A1 | | 9/2010 | Tomoguchi et al. |
| 2010/0229853 A1 | | 9/2010 | Vandal et al. |

FOREIGN PATENT DOCUMENTS

| | | |
|---|---|---|
| GB | 2132507 A | 7/1984 |
| WO | 83/00064 A1 | 1/1983 |
| WO | 00/07818 A1 | 2/2000 |
| WO | 2009/066101 A1 | 5/2009 |
| WO | 2009/106582 A2 | 9/2009 |
| WO | 2010/078105 A1 | 7/2010 |

* cited by examiner

SOLAR REFLECTOR IN COMPOSITE MATERIAL BASED ON RESIN REINFORCED WITH CUT FIBRES, AND USES IN SOLAR PLANTS

CROSS REFERENCE TO RELATED APPLICATION

The present application is the national phase of PCT Patent Application No. PCT/EP2011/069286 filed Nov. 3, 2011, which claims priority to French Patent Application No. 1004338, filed Nov. 4, 2010, the entire content of which is incorporated by reference herein.

The invention relates to a solar reflector in composite material, based on thermosetting or thermoplastic resin reinforced with cut fibres, coated with a layer which reflects the light, to a method of manufacture and to the use of this reflector in solar collectors for diverse applications such as in concentrated solar power plants.

Whereas the energy needs of the planet are constantly increasing, the reserves of many fossil resources that allow energy production are on the decrease. Moreover, the majority of industrialized nations are engaged in reducing emissions of greenhouse-effect gases and in the search for new, non-polluting energy sources with no greenhouse effect. The development of non-fossil energies is therefore an imperative necessity; to date, however, there exists no economically viable solution for taking over from fossil energies. Various technologies allow the energy of the sun to be converted, which is free and abundant on Earth. Among these technologies, concentrated solar has the potential to supply thermal and electrical energy on a large scale, since electrical energy can be generated directly, with photovoltaic sensors, or indirectly, with thermal solar systems which operate by exploiting the thermal effect of the solar radiation.

The purpose of concentrated solar power plants is to convert the energy of the sun into either electricity or heat. This technology consists in capturing the rays of the sun by means of a reflective surface, then focusing these rays onto the surface of a receiver composed of material which absorbs this radiation and which converts this concentrated light energy (radiation) into heat. A heat-transfer fluid circulating within the receiver allows this thermal energy (heat) to be transported to a system which converts this heat into electricity or into heat within a circuit for industrial use.

Concentrated solar power plants may be of four types: parabolic trough reflector plants, tower plants, parabolic dish reflector plants, and Fresnel reflector plants.

The reflector is a key element in concentrated solar power plants, in terms of cost, plant lifetime, energy yield, and maintenance.

A certain number of reflector technologies which can be used in concentrated solar power plants are known.

The technologies currently known, according to WO 2009/66101 and WO 2009/106582, in concentrated solar power plants use a reflector composed of a low iron oxide content glass four to five millimeters in thickness, coated with five layers of various coatings, organic and inorganic, for ensuring the reflection of the sun's rays and the integrity of the reflector over time: a reflective silver layer applied by successive spraying of a first layer of silver nitrate, then a layer of a reducing tin salt, a layer of copper for protecting the silver layer from corrosion, and three layers of paints, some of which may be lead-based, again for protecting the silver layer.

This type of reflector, however, presents a number of drawbacks. To start with, the presence of glass makes the reflector fragile, and several thousand reflectors may be broken during production, during installation and in the course of the life of a concentrated solar power plant. Additionally, the significant thickness of the glass, which is four to five millimeters for reasons of mechanical strength, not only gives rise to a high weight but also absorbs some of the light energy. The weight constitutes a strong constraint on the structures which hold the collectors and on the foundations which support these structures. As an example, the entirety of the collectors in a concentrated solar power plant, comprising the reflectors, the receiver and the structure, can weigh between 20 000 and 30 000 metric tons for one plant. The absorption of light energy by the low iron oxide content glass is of the order of 3% to 6%, and decreases the energy yield of the plant accordingly. This common type of reflector has a reflectance of less than 94%. Another problem of the glass reflectors is the degradation of the protective coatings located behind the silver layer by UV rays which are not absorbed or reflected by the silver layer. These glass reflectors must also have a glued attachment to their reverse to allow them to be attached to the structure. The stresses associated with climatic conditions such as UV, wind, heat, cold, humidity, and corrosive atmosphere have a tendency to degrade the adhesives used. In the case of tower plants, the glass reflectors must be gently curved on the installation site, thereby giving rise to damage and to the use of substantial means in order to guarantee the curvature of the glass, a key element in the energy yield of the plant. Lastly, since the glass reflectors are produced from flat glass which is curved under the action of heat, the manufacturing process consumes a large amount of energy, from the heating of between 550° C. and 1200° C. of the glass, and creates residual stresses within the glass which may modify the curvature of the reflector and give rise to optical defects and to a decrease in reflectance. The control of the curvature is a key element for guaranteeing the focusing of the light rays on the receiver and for optimizing the energy yield of the plant.

WO 2009/066101 describes a system for limiting the UV degradation of the coatings which protect the silver layer, by substantially increasing the thickness of the silver layer from 79-104 nm to more than 160 nm, and preferably around 260 nm. However, the other problems associated with glass reflectors are not solved by the invention described in this document. In fact, this document suggests increasing (by between +60% and +325%) the amount of silver used for manufacturing a reflector, in order to limit the UV degradation of the protective coatings.

WO 2009/106582 describes a prior treatment of the glass for the purpose of enhancing its impact resistance, but does not solve the other problems associated with glass reflectors; moreover, this treatment adds an additional step in the manufacture of the reflector.

WO 83/00064 describes the use of a composite as a support for a glass mirror in order to improve the robustness of the mirror. This system solves only a single problem of the glass reflectors, while increasing the weight of the reflector, since the weight of the composite support is added to that of the glass.

Flexible reflective films, without glass, are also described by U.S. Pat. No. 6,989,924 and WO 2010/078105. Nevertheless, these films do not constitute a reflector, since they have to be glued to a support in order to take on the curvature necessary for the reflection of the light rays onto the receiver and in order to be held to the structure of the collector. It is well known that glued bonds are a cause of breakdowns during the lifetime of the article.

A reflector consisting of a glass fibre-reinforced composite is described by U.S. Pat. No. 4,115,177. The process for manufacturing this reflector, first by simultaneous spraying of resin and glass fibre onto a mould, then by application of aluminium under vacuum, does not provide sufficient productivity for mass production of parts, as is necessary for the concentrated solar power plants, which require several hundred thousand reflectors per plant. Moreover, the skilled person is aware that the manufacture of a composite by simultaneous spraying gives rise to significant linear contraction on the finished part, this contraction having a detrimental effect on the quality of the reflective surface, with, in particular, an average roughness (mean Ra) of very much greater than 50 nm.

U.S. Pat. No. 5,428,483 discloses reflecting mirrors formed on the front surface of a carbon fiber-reinforced plastics (CFRP) substrate.

There is therefore a need to improve the known reflectors for solar energy plants in order to reduce their weight and their fragility, while increasing the solar ray reflection yield. Such improvements would make it possible to reduce the production, installation and maintenance costs of the reflectors and hence that of the collectors and of the concentrated solar power plants, and would thereby allow them to be used on a larger scale.

It has now been found that the use of a composite material under specific conditions, based on thermosetting or thermoplastic resin reinforced with cut fibres, allows this problem to be solved.

The invention therefore provides, according to a first subject, a solar reflector with a specific structure and composition, based on a composite material.

A second subject of the invention relates to specific methods for manufacturing said reflector as defined according to the first subject of the invention.

The invention also relates to a specific assembly of at least two reflectors of the invention.

Further, the invention relates to a collector comprising at least one reflector according to the invention, and more particularly at least one reflector and at least one receiver.

The invention also relates to the use of a reflector or a collector according to the invention in a concentrated solar power plant.

Last, the invention relates to a solar plant operating with concentrated solar power, comprising at least one reflector or at least one collector as defined according to the invention.

Accordingly, the first subject of the invention is a solar reflector comprising:
a) a curved or planar substrate which is a part moulded in composite material based on resin reinforced with cut fibres, preferably having a roughness (mean Ra) of less than 30 nm, more particularly less than 20 nm,
b) attachment elements carried integrally by said moulded part, substrate a), by the means of moulding alone and without any perforation of said substrate and without any adhesive or gluing means, these means b) being:
  b1) means for attaching said reflector to a support, said means being anchored or moulded in said moulded part, substrate a), and optionally
  b2) moulded attachment means which are means for assembly between moulded parts, substrates a), preferably by interlocking of the edges of said moulded parts, c) a reflective layer of silver-based metallic coating with a thickness of from 60 to 200 nm, preferably from 60 to 150 nm, having a reflectance of more than 94%. Said reflectance is measured in accordance with standard ISO 9050.

According to a first possibility, said metallic coating of layer c) is applied directly to said substrate a). According to another possibility, which is preferred, it is applied to a layer d) of adhesion-promoting organic coating, d) being applied directly to said substrate a) and before said layer c). The thickness of said layer d) may vary from 0.1 to 20 µm.

Where the moulded part which forms said substrate a) has a roughness after moulding of more than that preferred according to the invention (greater than 30 nm or even, in more particular cases, greater than 20 nm), it may be treated before the application of d) and c) with a specific coating composition having the function of acting to block any pores or to reduce the roughness of the moulded part obtained after moulding, in order to reduce the roughness to below the preferred limit of 30 nm and more particularly below 20 nm. As an example of such a composition suitable for the invention, mention may be made of a composition comprising as binder at least one acrylic resin and acrylic monomers.

According to a more particular and preferred, possibility, said coating of layer d) is at the same time a coating which acts to reduce the roughness of said moulded part obtained after moulding. A specific coating composition of this kind may comprise for example, as essential components, at least one acrylic resin and at least one acrylic monomer, and preferably an acrylic urethane resin and at least one polyfunctional acrylic monomer, and more preferably an acrylic urethane resin and a mixture of at least one polyfunctional acrylic monomer and at least one monofunctional acrylic monomer.

According to a second possibility, and depending on the method used, the metallic layer c) is applied to the surface of the mould used for moulding said substrate, before moulding of said composite substrate, by a technology similar to the application of a gel coat to a composite, which involves applying said metallic layer c) either by spraying in liquid phase or by application in the form of a sheet or film.

According to one optional variant of said reflector of the invention, it comprises moulded attachment means b2) (in one piece with the moulded substrate a)), which are means for assembly between moulded parts (substrates a)) and preferably for assembly by interlocking between the (outer) edges of said moulded parts.

Said moulded part in composite material of said substrate a) is advantageously obtained from a moulding composition comprising at least one thermosetting or thermoplastic resin and reinforcing cut fibres and, optionally, moulding additives selected from fillers, anti-contraction additives for thermosets, pigments, antistatic additives, UV absorbers, maturation agents or any other usual additive of a moulding composition. Said moulded part in composite material of said substrate a) optionally comprises a core material—that is, a material which is situated within the composite material and represents between 45% and 95% of the thickness of the composite material, selected from plastic foams and more particular from PVC (polyvinyl chloride) foams, SAN (styrene-acrylonitrile) foams, PEI (polyetherimide) foams and PU (polyurethane) foams.

Thermosetting resins suitable for the invention may be selected, for example, from an unsaturated polyester resin, an epoxy resin, a vinyl ester resin, a (crosslinkable) polyurethane resin, a phenolic resin, a resin derived from at least one of these resins by chemical modification, or mixtures of these resins, and more particularly of at least two of these resins. Examples of resins derived by chemical modification include unsaturated polyesters and/or vinyl esters modified with polyisocyanates, such as unsaturated polyester-urethane resins, dicyclopentadiene (DCPD)-modified unsaturated polyesters or amine-modified epoxides such as epoxy-amine prepolymers which are crosslinkable using epoxides.

The resin for the composite material of the substrate a) is preferably a thermosetting resin. The thermosetting resin is preferably selected from unsaturated polyester resins and/or vinyl ester resins and/or epoxy resins, and more preferably from unsaturated polyesters and/or vinyl esters. These resins have a UV stability sufficient to allow this substrate not to be degraded by the UV rays which are not absorbed or reflected by the silver layer.

As thermoplastic resins suitable for the invention it is possible to select, for example, a polypropylene resin, a polyamide resin, a polybutylene terephthalate resin, a polyethylene terephthalate resin, a polyphenyl sulfone resin, a polycarbonate resin, a polyphenylene oxide (PPO) resin or a mixture or alloy of these resins, more particularly of at least two of these resins. The thermoplastic resin is preferably selected from polyamide resins and/or polybutylene terephthalate resins.

The fibres are cut fibres, for example, glass fibre, aramid fibre, basalt fibre, flax fibre, hemp fibre, bamboo fibre or a mixture of at least two of these fibres, excluding carbon fibres because they best used as woven or non-woven fabric but unsuitable for use as cut fibres in this invention. The preferred reinforcing cut fibres are selected from glass fibres and aramid fibres, and more preferably from glass fibres.

Moulding additives which may be present in the moulding composition based on thermosetting or thermoplastic resin include, for example, fillers, pigments, antistatic additives and UV absorbers. Suitable fillers include, for example, calcium carbonate, calcium sulfate, aluminium trihydrate, kaolin and aluminosilicates.

Examples of antistatic agents which in the case of the present invention prevent dust attraction and facilitate cleaning include the following: acetylene black, graphite and conductive fillers.

Suitable UV absorber agents include the following: hindered amines of HALS types, triazines and benzotriazoles. An example of such UV absorbers is Tinuvin® 328 from BASF or Lowilite® 26 from Chemtura.

In a moulding composition based on thermosetting resin which is crosslinkable via ethylenic unsaturation, such as unsaturated polyesters or vinyl esters, the presence of at least one anti-contraction additive is preferably desirable in order to limit surface defects and the roughness that are created by the linear contraction effect resulting from the consumption of the ethylenic unsaturation (opening). Anti-contraction additives of this kind are selected from polystyrene, polymethyl methacrylate, polyvinyl acetates or saturated polyesters.

As preferred anti-contraction additives in the case of the present invention, mention may be made of the following: polymethyl methacrylate, saturated polyesters and polyvinyl acetates.

Where the thermosetting resin is an unsaturated polyester or comprises an unsaturated polyester, a maturation agent may be added to the moulding composition, and is selected from magnesium oxide (MgO) or magnesium hydroxide or calcium hydroxide or an isocyanate. This agent allows a controlled increase in the viscosity of the moulding composition. In this case, the unsaturated polyesters preferably carry carboxyl groups sufficient for this maturation, except in the case of maturation by isocyanate, in which case said polyesters are preferably hydroxylated.

According to another particular embodiment, the reflector according to the invention may comprise, in addition to components a), b), c) and optionally d), as defined above, an additional layer e) of adhesion-promoting organic coating, with a thickness of from 0.1 to 20 µm, this layer e) is applied directly to said reflective layer c).

According to another option, it may further comprise a layer f) of organic coating for protecting against corrosion of said reflective layer c), said layer f), with a thickness of 10 to 150 µm, being applied to said layer e) (if present) or to said layer c), if layer e) is absent. Said layer f) is preferably present.

According to a more particular and preferred option, the function of said layer e) for promoting the adhesion may be fulfilled by the single layer f) alone, which at the same time fulfils the function of protecting against corrosion.

According to another option, the reflector of the invention further comprises a layer g), with a thickness of 10 to 150 µm, of organic coating for protecting the layer c) against UV rays (anti-UV), it being possible for said layer g) to be applied either directly to said layer c) or to a layer e) or f) as defined above, and preferably to a layer f).

The reflector of the invention may further comprise a layer h), with a thickness of from 1 to 20 µm, of organic coating for protecting against abrasion, which is applied in a last layer as a superficial outer layer. According to one particular case of a reflector of the invention, at least the superficial layer h) is present. A preferred reflector according to the invention comprises all of the layers e), f), g) and h) as defined above.

According to one preferred variant of said layer h), it comprises anti-fouling additives selected from nanometric titanium dioxide (size lower than 200 nanometers), silver nanoparticles, and carbon nanotubes.

The adhesion-promoting organic coating layer d) or e) as defined above is preferably based on a coating composition comprising at least one acrylic resin and at least one acrylic monomer and crosslinkable by radiation or thermally. Thermal crosslinking, according to the invention, signifies the use of a free-radical initiator, such as peroxides.

Said layer f) of coating for protecting the layer c) against corrosion (anti-corrosion coating) may be based on an organic coating composition which comprises, in addition to a crosslinkable organic binder, at least one antioxidant additive selected from sterically hindered phenols such as pentaerythritol tetrakis(3-(3',5'-di-tert-butyl-4'-hydroxyphenyl)propionate), known under the name Irganox® 1010 from BASF, and/or phosphites such as bis(2,4-di-tert-butylphenyl) pentaerythritol diphosphite, known under the name Ultranox® 626 from Chemtura.

Said layer g) of coating for protecting the layer c) against UV rays may be based on an organic coating composition which comprises at least an aliphatic crosslinkable organic binder, preferably a polyfunctional acrylic binder, and at least an anti-UV additive, preferably selected from sterically hindered amines (HALS), benzotriazoles and triazines. Examples of such anti-UV additives include, among the benzotriazoles: Tinuvin® 1130 or Tinuvin® 384 from BASF or Lowilite® 28 from Chemtura. Among the triazines, they include Tinuvin® 400 or Tinuvin® 1577 from BASF. Examples of such sterically hindered amines HALS include Tinuvin® 292 HP or Tinuvin® 900 or Chimassorb® 944 or Tinuvin® 123 or Tinuvin® 2020 from BASF or Lowilite® 62 from Chemtura.

Said layer h) of coating for protecting against abrasion may be based on an organic coating composition which comprises at least one crosslinkable organic binder selected from siloxane resins, urethane resins or acrylic resins.

The second subject of the invention relates to a method for manufacturing the solar reflector as defined according to the invention above.

A first method for manufacturing comprises the following successive steps:
i) moulding a substrate a) in composite material based on a resin reinforced with cut fibres, including attachment elements b) as defined above,
ii) optionally, applying a layer d) of organic coating for promoting adhesion and/or reducing roughness, directly to said substrate a),
iii) applying a reflective layer c) of silver-based metallic coating, by wet application or by vacuum application, comprising the washing and drying of said layer c), before
iv) optionally applying to said layer c) one or more layers (up to four different layers) of organic coating selected from: adhesion-promoting coating e) on layer c) and/or coating for protecting against corrosion f), on layer c) or e), and/or coating for protecting against UV rays, g), on layer c) or e) or f), and/or coating against abrasion, h), on layer c) or e) or f) or g), depending on the presence of said layers e), f) or g), with the application of one layer to another being carried out after full or partial crosslinking of the support layer,
v) crosslinking each of said layers e), f), g) or h), if present in step iv), by radiation and/or thermally, depending on the crosslinkable composition, before applying the following layer.

According to this first method, step i) of moulding said substrate a) may be carried out by a moulding process selected from Sheet Moulding Compound (SMC), Bulk Moulding Compound (BMC), Resin Transfer Moulding (RTM), pultrusion, thermoplastic compression, thermoplastic injection or vacuum infusion, or by a process derived from at least one of these processes.

All of these processes allow a reflector to be manufactured that comprises two or more functions integrated in the material: for example, the attachment of the reflector to the carrying structure, integrated sensors for tracking the sun, sensors for the real-time monitoring of the reflectance of the reflector, and reinforcements for the stiffness of the mirror. According to one preferred aspect of the invention, the composite material, i.e. the moulded part, substrate a), is manufactured by SMC or RTM moulding or by vacuum infusion, in order to produce significantly increased productivity that allows the reflector to be produced with a short cycle time and the lowest possible, the smoothest possible surface condition and a controlled contraction with an acceptable roughness.

In the case of a substrate manufactured by RTM or vacuum infusion or any process derived from these two processes, the substrate a) in composite material has a thickness of between 4 and 30 mm, and preferably between 10 and 28 mm, a density of between 0.2 and 1.6, and preferably between 0.2 and 0.6, and a linear contraction of less than 0.15%. In the case of a substrate manufactured by RTM or vacuum infusion, the cycle time is greater than the cycle time obtained by the SMC moulding process, but the size of the substrate is also greater, with an attainable substrate surface area very much greater than ten square meters. The cycle time per $m^2$ of substrate is therefore short. Preferably, and in the case of a substrate manufactured by SMC moulding, the substrate a) in composite material has a thickness of between 1.5 and 4 mm, a surface area of less than 10 square meters, a density of between 1.2 and 2.4, a linear contraction of less than 0.15%, a flexural stress of between 100 MPa and 500 MPa, preferably between 150 MPa and 250 MPa, a flexural modulus of between 5 GPa and 20 GPa, a Charpy impact strength of between 60 and 200 kJ/$m^2$, and an elongation at break of between 1% and 3%. The SMC moulding of this substrate a) in composite material may be carried out at a temperature of between 120° C. and 180° C., at a pressure of between 40 bar and 100 bar, with a cycle time of between 1 and 5 minutes. Owing to its density and its thickness, this substrate a) allows a saving in average weight of 49% in relation to a glass reflector with a density between 2.4 and 2.5, and a thickness of 4 mm. Moreover, this substrate a) in composite material involves fewer manufacturing steps than the known reflectors of the prior art, by virtue in particular of the integration of various additional functions into one moulded part, these functions being possible because of the selected nature of the substrate a) and the possibility of manufacturing it by a moulding process. This manufacturing method is also less energy-consuming, the temperature of the method being between 120° C. and 180° C., rather than 550° C. to 1200° C. for glass. The mechanical properties of this composite material are also greater than those of glass thus making it a much less fragile material which is resistant to impacts and to severe climatic exposure conditions.

Step iii) of said first method, which relates to the application of said reflective layer c), may be carried out in two substeps: first, wet application of a solution of silver nitrate, followed subsequently by the wet application of a reducing agent, to form a layer of metallic silver, which is the reflective layer.

Said reflective layer c) is advantageously composed of a metallic silver layer with a thickness of between 60 and 200 nm, preferably between 60 and 150 nm. The metallic layer may also be applied by vacuum application and preferably by wet application.

The reflector may further comprise, where appropriate, an intermediate layer d) between the composite material substrate a) and the reflective layer c). The aim of said layer d) is to improve the adhesion of the metallic layer c) with the composite material substrate a) and to provide a smooth surface condition before the application of the metallic layer c) of silver. A roughness of a few nanometers may be obtained with, for example, the application of a UV varnish comprising acrylic monomers with an acrylic resin and a free-radical initiator.

Since the reflective layer c) is a layer of silver, it is also possible to add to the reflector one or more layers above the reflective layer c), in order to protect the reflective layer over time against corrosion (anti-corrosion or anti-oxidation layer), against UV rays (anti-UV layer) or against abrasion (anti-abrasion or anti-wear). These optional layers include, for example, an anti-abrasion layer h) on the outermost surface of the reflector, a UV protection layer g), a layer f) for protecting against corrosion (anti-corrosion layer), and an adhesion-promoting layer e) between one of the previous layers and the reflective layer c).

This anti-abrasion layer h), with a thickness of between 1 and 20 µm, may be composed, for example, of a formulation based on crosslinkable organic binder, among acrylic resins based on acrylic monomers and oligomers or among urethane or polyurethane resins or among siloxane resins. This layer h) is applied wet and crosslinked under radiation or thermally. The layer h) may also contain additives allowing the surface of the reflector to be easily cleaned, such as, for example, nanometric particles of titanium dioxide, silver nanoparticles, and carbon nanotubes.

The anti-UV and anti-corrosion layers g) and f), respectively, have thicknesses of between 10 and 150 μm. The layer f) is based on an organic coating composition which comprises, in addition to a crosslinkable organic binder based on acrylic monomers and oligomers, or based on polyurethanes, at least one antioxidant additive selected from sterically hindered phenols and/or phosphites. This layer is applied wet and crosslinked under radiation or thermally.

The composition of the anti-UV layer g) is based on an organic coating composition comprising at least one aliphatic crosslinkable organic binder, preferably a polyfunctional acrylic binder, and at least one anti-UV or UV absorbing additive, preferably selected from sterically hindered amines HALS, benzotriazoles and triazines, preferably at a concentration of between 0.5% and 10% for the benzotriazoles and triazines. Examples of suitable products include the commercial UV absorbers from BASF such as Tinuvin® 1577, Tinuvin® 1130, Tinuvin® 384 and Tinuvin® 400.

In combination with the UV absorber or absorbers of this type, HALS-type hindered amines may be added to the formulation. Examples of HALS-type hindered amines that may be added at a concentration of between 0.05% and 4% are the commercial products Chimassorb® 944, Tinuvin® 123, Tinuvin® 292 HP, Tinuvin® 900 and Tinuvin® 2020 from BASF. The formulation of the anti-corrosion layer f) contains one or more phenolic antioxidants, such as Irganox® 1010, or phosphite antioxidants, such as Ultranox® 626, at a concentration of between 0.1% and 10%.

The adhesion-promoting layer e), which is optional between the reflective layer c) and one of the above-defined protective layers f), g) and h), with a thickness of 0.1 to 20 μm, is based on a coating composition comprising at least one acrylic resin and at least one acrylic monomer which is crosslinkable by radiation or thermally.

According to a second method, said solar reflector may be entirely moulded in the mould used for the moulding of said substrate a), with all of the layers present successively, from c) to h) as defined above, these layers being applied one after another and each to the other, and with the outermost layer, preferably h), being applied to the internal surface of the mould used for moulding said substrate a), and with the innermost layer, preferably d), being applied last and after the layer c), this being carried out before the moulding of the composite of said substrate a), and with each layer being applied by spraying in liquid phase and subsequently crosslinked by radiation or thermally, prior to the application of a new layer in liquid phase, and with said composite material of the substrate a) being moulded last onto said innermost layer present, in order to give, after demoulding, said solar reflector of the invention in its entirely with all of its components. This method is similar to that of a moulded composite coated with a gel coat manufactured in the same way and entirely by moulding and in the reverse order, in other words first with application of the gel coat to the internal surface of the mould, and subsequently moulding of the composite on the gel coat. The outer surface of the part thus moulded (complete solar reflector) is the surface in contact with the internal surface of the mould for moulding.

According to one variant of this moulding method for the complete solar reflector, at least one layer or all of the layers is or are applied in the form of a film or sheet, a metallic film or sheet for layer c) and a polymeric film or sheet for the other layers; where all of the layers are applied in the form of a film or sheet, this film or sheet is a preformed assembly of all of the layers with said film or sheet, which are applied beginning with the internal surface of the mould, as before, in the reverse order, in other words before the moulding of said composite substrate a) onto the innermost layer, which is c), or d) if layer d) is present and applied to c). The solar reflector remains identical to that defined above, the only change being in the order of the manufacturing steps between layers c) to h) and substrate a), to which the first layer is always applied following demoulding of the layers+ substrate assembly.

Accordingly, this second method, which is a method for manufacturing the complete reflector of the invention by moulding, may be summarized as comprising the following successive steps:

j) applying a reflective metallic layer c) to the internal surface of the mould used to mould the substrate a) in composite material with, optionally, the application of said layer c), only after the application to said internal surface of said mould of at least one of the layers e) to h) as defined, in accordance with the invention, above, in the reverse order starting from h) first to e) last, before applying said layer c) to the last layer thus applied, which may be: e) or f) or g) or h), k) optionally, applying to said layer c) a layer d) as defined above according to the invention, l) moulding said substrate a) in composite material onto said layer c) or onto said layer d) if present, said composite material being based on a resin reinforced with cut fibres, including attachment elements b) as defined above, m) demoulding the complete reflector according to the invention with all or a part of said layers h) to c) being applied to the internal surface of said mould or to the subsequent layer, alternatively by spraying in liquid form, followed by radiation crosslinking, preferably UV-crosslinking, or thermal crosslinking, and with all or a part of said layers being applied in the form of a preformed film or preformed sheet.

The skilled person is capable, on the basis of the description of the invention and of his or her general knowledge, of producing the organic coatings suitable for the various organic layers cited, in accordance with the protective properties described above.

Figure 1:
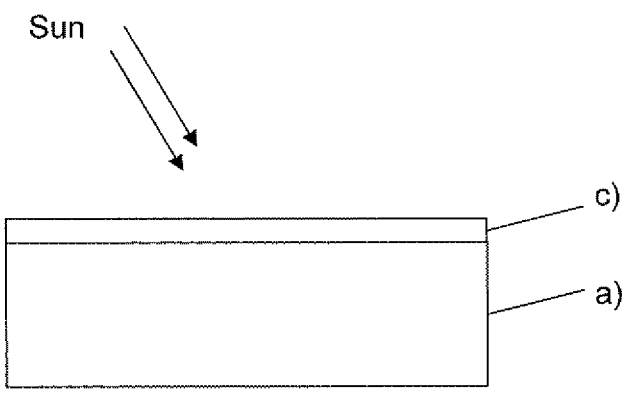
FIG. 1 shows a cross section through the simplest form of the reflector according to this invention.
Figure 2:
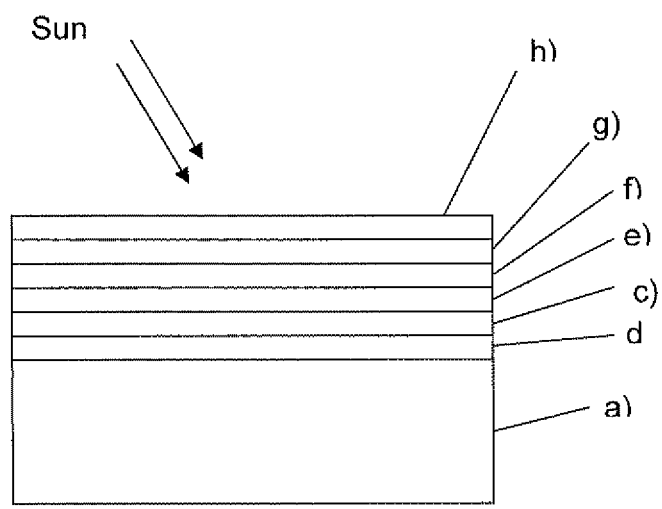
FIG. 2 shows a cross section through a more particular form of the reflector according to this invention, with the presence of layers d), e), f), g) and h).

According to FIG. 1, the reflector is composed of a substrate a) in composite material, on which a reflective layer c) of metallic coating is applied.

Another subject of the invention relates to an assembly of solar reflectors, this assembly comprising at least two (two or more) reflectors as defined above according to the invention, preferably assembled with one another by moulded attachment means b2) as defined above, thereby facilitating the easy assembly of said reflectors. Said moulded attachment means are at the edges (extremities) of the moulded parts forming the substrates a) and may be means allowing the interlocking of the extremities, for example by a system of grooves and profiled moulded extremities which interlock by simple gliding of one part into the other. An assembly of this kind is preferably produced after finishing of the single reflector (bearing the reflective layer and any other layers). This is a further advantage of the system of reflectors according to the present invention, which allows rapid and easy assembly between moulded parts with no need for a step of perforation or gluing in order to assemble the parts, or in order to fix them to a support structure carrying a reflector or an assembly of reflectors. Such an assembly of reflectors can be used for constructing solar collectors, which are the elementary units of a solar plant. The advantage of such an assembly is that it is compact, lightweight and robust in spite of the significant increase in the surface area for reflection of the solar radiation, thereby making it possible, at reduced cost, to increase significantly the solar energy reflected.

The present invention in fact also relates to a solar collector characterized in that it may comprise at least one reflector of the invention or reflector manufactured by the method of the invention, or in that it may comprise at least one assembly of reflectors according to the invention as defined above. More particularly, a solar collector of this kind further comprises at least one receiver for the solar radiation reflected by said reflector or by said assembly of reflectors. Said receiver may be a tube which absorbs solar radiation and in which there circulates a heat-transfer fluid, allowing the heat generated to be recovered by a system of heat exchangers.

A last subject of the invention relates to a solar plant, more particularly a concentrated solar power plant, which is characterized in that it comprises at least one reflector defined according to the invention or manufactured by a method defined according to the invention, or in that it comprises at least one assembly of reflectors as defined according to the invention or at least one solar collector as defined according to the invention described above. A plant of this type according to the invention may be a plant for producing electricity or for producing steam. More particularly it is a plant for producing heat, for producing hydrogen, for desalinating (desalting) water, for producing energy for the chemical industry or petroleum industry, or for air conditioning.

The invention is non-limitatively illustrated by the examples below.

EXAMPLE 1: PREPARATION OF A COMPOSITION FOR THE SMC MOULDING OF THE COMPOSITE MATERIAL OF THE SUBSTRATE a)

The following composition is prepared:

TABLE 1

| moulding composition for composite material for substrate a) | | | | |
|---|---|---|---|---|
| Trade name of the component | Supplier | Name/chemical nature | Function | Amount (% by weight) |
| Norsodyne ® M 01510 | Cray Valley | Unsaturated polyester resin | Thermosetting resin | 14% |
| Norsolook ® A 70091 | Cray Valley | Polyester resin | Anti-contraction additive | 7% |
| Norsolook ® A 74094 | Cray Valley | Acrylic resin | Anti-contraction additive | 2% |
| P 204 | OCV | Glass fibre | Reinforcement | 25% |
| Millicarb OG | OMYA | Calcium carbonate | Filler | 46.2% |
| Styrene | TOTAL | Styrene | Diluent | 3% |
| MK 35 NV | LEHMAN & VOSS | Magnesium oxide | Maturation agent | 0.8% |
| C18Ca | Peter Greven | Calcium stearate | Mould release agent | 1% |
| W 9010 | BYK | — | Additive | 0.7% |
| PBQ | UNIVAR | Quinone | Inhibitor | 0.01% |
| Luperox ® MC | ARKEMA | Peroxide | Initiator | 0.3% |

The invention therefore likewise relates to the use of the reflector of the invention in a collector and to the use of this collector in a concentrated solar power plant. In particular, said collector is composed of a plurality of reflectors or of an assembly of reflectors as defined above, one or more receivers, and a carrying structure. Different types of collectors are described in pages 17 to 30 of the document "Concentrating Solar Power, Global Outlook 2009", published by Greenpeace International, SolarPACES and ESTELA. A tracking system may be added to these collectors so that the reflectors are mobile and aligned facing the rays of the sun throughout the day.

Accordingly, the present invention also covers the use of a solar reflector as defined according to the invention or manufactured by the method defined according to the invention, or the use of an assembly of reflectors as defined according to the invention as described above, for the manufacture of a solar collector or of a solar plant or of a plant for producing energy, more particularly electrical energy, or for producing steam. The invention likewise covers the use of a solar collector as defined according to the invention for the manufacture of a solar plant, or a plant for producing energy, more particularly electrical energy, or for producing steam.

Mixing was carried out by milling the Norsodyne® M 01510 resin with the Norsolook® A 70091 and Norsolook® A 74094 additives, the Millicarb OG fillers, the styrene, the W 9010 additive, the C18Ca, the PBQ and the Luperox® MC initiator. The MK 35 NV maturation agent is then added and this mixture is applied to a thermoplastic film to which is applied the glass fibre, cut with a length varying between 1.27 and 5.08 cm (0.5 and 2 inches). This mixture is conditioned for 15 days (at a temperature of between 20 and 25° C.) for the mixture to mature, and then these sheets are moulded in an SMC Duroline press from Dieffenbacher at 150° C. and 80 bar to give the substrate a) according to the invention, having a mean-Ra roughness of 15 nm.

EXAMPLE 2: UV-CROSSLINKABLE VARNISH, ADHESION PROMOTER BETWEEN THE COMPOSITE MATERIAL SUBSTRATE A) AND THE REFLECTIVE SILVER LAYER c)

The CN9010EU is mixed with the SR341, SR285 and S350 reactive diluents. Following addition of the Darocure 1173 this varnish is applied by gun, at a thickness of approximately 10 μm, to the composite substrate a) obtained in example 1), and this substrate thus coated is exposed to a 400 W metal halide UV lamp for one minute.

| Trade name of the component | Supplier | Name/chemical nature | Function | Amount (in % by weight) |
| --- | --- | --- | --- | --- |
| CN9010EU | Sartomer | Aliphatic urethane acrylate, hexafunctional | Resin (binder) | 50% |
| SR341 | Sartomer | Methylpentanediol diacrylate | Monomer | 20% |
| SR285 | Sartomer | Tetrahydrofurfuryl acrylate | Monomer | 16% |
| SR350 | Sartomer | Trimethylolpropane trimethacrylate | Monomer | 10% |
| Darocure ® 1173 | BASF | 2-Hydroxy-2-methyl-1-phenyl-1-propanone | Photoinitiator | 4% |

EXAMPLE 3: APPLICATION OF THE METALLIC SILVER REFLECTIVE LAYER

To the substrate a) thus coated, a layer of a silver nitrate solution corresponding to 900 milligrams of elemental silver per square meter is applied by spraying. Subsequently a solution of tin dichloride in order to reduce the silver salt to metallic silver is applied by spraying.

The invention claimed is:

1. A solar reflector comprising:
a curved or planar moulded substrate comprising composite resin material reinforced with cut fibres, wherein the moulded substrate with the cut fibres has a mean roughness of less than 30 nm and is made by a moulding process selected from the group consisting of Sheet Moulding Compound, Bulk Moulding Compound and vacuum infusion, and
a reflective layer of silver-based metallic coating with a thickness of from 60 to 200 nm and a reflectance of more than 94% in accordance with standard ISO 9050, wherein the solar reflector is without a glass layer.

2. The solar reflector of claim 1, wherein said metallic coating is applied directly to said moulded substrate.

3. The solar reflector of claim 1, wherein said metallic coating is applied to a first organic, adhesion-promoting coating, wherein the adhesion-promoting coating is disposed between said moulded substrate and said metallic coating.

4. The solar reflector of claim 3, wherein said adhesion-promoting coating reduces the roughness of said moulded substrate.

5. The solar reflector of claim 3, wherein the thickness of said adhesion-promoting coating is from 0.1 to 20 μm.

6. The solar reflector of claim 1, wherein said moulded substrate comprises interlocking edges.

7. The solar reflector of claim 1, wherein said moulded substrate comprises at least one thermosetting or thermoplastic resin, and optionally further comprising moulding additives.

8. The solar reflector of claim 7, wherein said at least one thermosetting or thermoplastic resin is a thermosetting resin selected from the group consisting of an unsaturated polyester resin, epoxy resin, vinyl ester resin, phenolic resin, and polyurethane resin; or derivatives or mixtures thereof.

9. The solar reflector of claim 7, wherein said at least one thermosetting or thermoplastic resin is a thermoplastic resin selected from the group consisting of a polypropylene, polyamide, polybutylene terephthalate, polyethylene terephthalate, polyphenyl sulfone, polycarbonate, and polyphenylene oxide (PPO); or mixtures or alloys thereof.

10. The solar reflector of claim 1, wherein said reinforcing cut fibres are selected from the group consisting of glass fibres, aramid fibres, basalt fibres, flax fibres, hemp fibres, and bamboo fibres.

11. The solar reflector of claim 3, further comprising a second organic adhesion-promoting coating with a thickness of from 0.1 to 20 μm, wherein said second organic adhesion-promoting coating is applied to said metallic coating on the opposite side of said first organic adhesion-promoting coating.

12. The solar reflector of claim 3, further comprising an organic corrosion-protecting coating with a thickness of 10 to 150 μm, wherein said organic corrosion-protecting coating is applied directly to said metallic coating.

13. The solar reflector of claim 12, wherein said organic corrosion-protecting coating promotes adhesion and protects against corrosion.

14. The solar reflector of claim 12, further comprising an organic anti-UV coating with a thickness of 10 to 150 μm, wherein said organic anti-UV coating is applied directly to said corrosion-protecting organic coating.

15. The solar reflector of claim 1, further comprising an organic abrasion-protecting coating with a thickness of from 1 to 20 μm, wherein said organic abrasion-protecting coating is applied in a last layer as a superficial external layer.

16. The solar reflector of claim 15, wherein said organic abrasion-protecting coating comprises anti-fouling additives of nanometric titanium dioxide, wherein the particle size of the titanium dioxide is less than 200 nanometers; silver nanoparticles; or nanotubes.

17. The solar reflector of claim 11, wherein said first organic adhesion-promoting coating or said second organic adhesion-promoting coating comprises at least one acrylic resin and at least one thermally crosslinkable or radiation-crosslinkable acrylic monomer.

18. The solar reflector of claim 12, wherein said organic corrosion-protecting coating comprises a crosslinkable organic binder and at least one antioxidant additive selected from the group consisting of sterically hindered phenols and phosphites; or a combination thereof.

19. The solar reflector of claim 14, wherein said organic anti-UV coating comprises at least one aliphatic crosslinkable organic binder and at least one anti-UV additive.

20. The solar reflector of claim 15, wherein said organic abrasion-protecting coating comprises at least one crosslinkable organic binder selected from the group consisting of siloxane resins, urethane resins, and acrylic resins.

21. A solar collector comprising at least one solar reflector of claim 1.

22. The solar collector of claim 21, further comprising at least one receiver of solar radiation reflected by said solar reflector or assembly of solar reflectors.

23. The solar reflector of claim 11, further comprising an organic corrosion-protecting coating with a thickness of 10 to 150 μm, wherein said corrosion-protecting organic coating is applied to said second organic adhesion-promoting coating.

24. The solar reflector of claim 1, further comprising an organic anti-UV coating with a thickness of 10 to 150 μm, wherein said anti-UV organic coating is applied directly to said metallic coating.

* * * * *